United States Patent [19]

Burton

[11] 4,200,891

[45] Apr. 29, 1980

[54] ELECTROMAGNETIC BOND PHOTOCOPY DEVICE

[76] Inventor: Gordon Burton, 1262 Bluebird, Salt Lake City, Utah 84107

[21] Appl. No.: 906,677

[22] Filed: May 16, 1978

[51] Int. Cl.² .............................................. G01D 15/06

[52] U.S. Cl. .................................. 358/301; 346/74.1; 355/3 R; 358/212

[58] Field of Search ............... 355/3 R, 133; 358/212, 358/301; 346/74.1

[56] References Cited

U.S. PATENT DOCUMENTS

| | | | |
|---|---|---|---|
| 1,880,289 | 10/1932 | Sukumlyn | 358/212 X |
| 3,526,704 | 9/1970 | Heller | 358/301 X |
| 3,778,145 | 12/1973 | McClure | 355/3 R |
| 3,824,601 | 7/1974 | Garland | 346/74.1 |

*Primary Examiner*—R. L. Moses
*Attorney, Agent, or Firm*—Trask & Britt

[57] ABSTRACT

A photocopy device having an image reception plate sensitive to light which generates a signal to activate an image producing plate is disclosed. The image reception plate has a large number of discrete receptors which are activated by light or conversely, which are activated by the absence of light. A large number of discrete electrical signals are generated by those receptors on the reception plate which are activated. The receptors which are activated are in the form of the image to be produced. The electrical signals go to the image producing plate to minute, discrete electromagnets which are activated in the form of the image to be reproduced. The image producing plate is identical to the image reception plate in that the number of electromagnets or field areas is equal to the number of photo receptors and the electrical connection from a photo receptor is to a corresponding electromagnet which has a similar position on the reproducing plate to the photo receptors position on the image receptor plate.

3 Claims, 8 Drawing Figures

ELECTROMAGNETIC BOND PHOTOCOPY DEVICE

BACKGROUND OF THE INVENTION

1. Field

Figure 1:
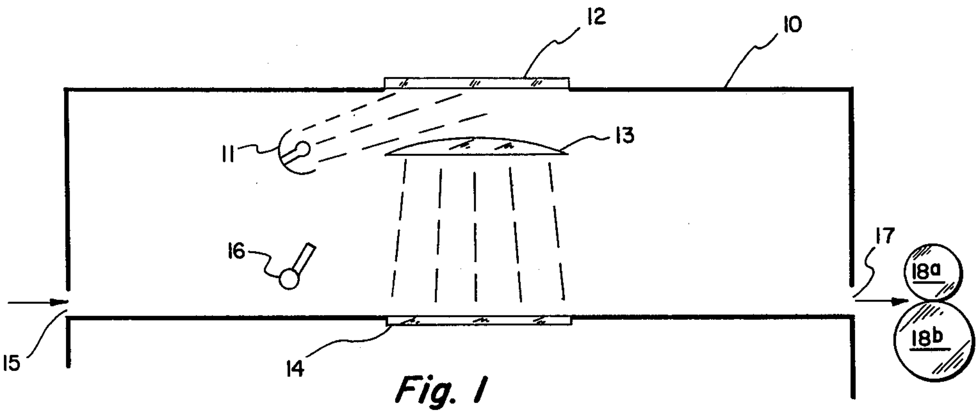

The instant invention relates primarily, but is not restricted to, photocopy devices utilizing a visible light source to impress an image upon a photo receptor plate to transfer an image to an unsensitized sheet of paper or other material.

2. Prior Art

Prior art techniques include the major copying processes of xerography, direct electro static and a gelatin transfer process identified as verifax. The xerography process involves the charging of a single drum with electricity. The charged drum is then sensitive to light. The original image is projected upon the drum by shining visible light through the material to be reproduced through a lens onto the drum. Those areas of the drum which are struck by the light lose their electrical charge. Those which are not struck by the light retain their positive electrical charge. The result is a latent electrostatic image on the drum that is a mirror image of the original document. The drum is then cascaded with a black powder, called toner. The powder has a negative charge and adheres to the drum. The image becomes visible on the drum, but is a mirror image of the image to be reproduced. A paper on which the image is to be reproduced is then passed in contact with the drum while charged with electricity. The charge of electricity causes the toner particles to leave the drum and adhere to the paper. At this point the copy is a powder image on the paper but it is not permanent. Thereafter, the image is fused to the paper by melting the powder into the paper.

The direct electrostatic, known in the industry frequently as the electrofax technique, transfers the image directly onto a sensitized copy paper rather than using a sensitized drum as a transfer medium. The paper used in this process is coated with zinc oxide, which acts as a photoconducting material. The zinc oxide coated paper is first given a negative charge in the dark by a corona discharge which makes the paper light sensitive. The paper is then exposed to the image which is projected through a lens system from a visible light source. Light from non-image areas of the document causes the electrical charge on the paper to be dissipated in the corresponding areas. At this point the sensitized paper has a latent, invisible image that is an exact duplicate of the image on the original. The image on the paper can be developed through the use of either a dry or liquid toner. In the dry method of development the developer, consisting of a mixture of pigmented resin powder and iron particles, is applied to the paper by means of a "magnetic brush" which is a magnet that holds the developer mixture. As the brush moves across the paper the positively charged resin powder adheres to the negatively charged image areas of the paper while the iron particles are retained on the magnet. The iron particles are used as a carrier for the resin powder. The paper containing the developed image is then heated for a few seconds to fuse the resin powder to the paper. The image may also be developed by passing it through a liquid developer. The suspended pigment particles cling to the charged areas of the paper by electrostatic attraction and are held to it permanently usually by a resin binder. After most of the liquid developer has flowed off the papers, the remainder is ordinarily removed by blowing warm air across it.

The gelatin transfer method, verifax, uses a light sensitive sheet called a matrix. The matrix consists of paper coated with unhardened gelatin containing a variety of chemicals, one of which is silver halide. The reproduction of images is essentially a photographic phenomenon.

OBJECTS OF THE INVENTION

It is an object of the instant invention to provide a photocopy device which is simple in construction and operation.

It is a further object of the instant invention to provide a photocopy device wherein multiple copies may be made from a single exposure.

It is a further object of the instant invention to provide a photocopy device which has very low power requirements.

It is a further object of the instant invention to provide a photocopy device which can be battery operated and portable.

It is still a further object of the instant invention to provide a photocopy device which utilizes, but is not restricted to, ordinary bond paper.

SUMMARY OF THE INVENTION

The instant invention comprises an image reproducing device having an electromagnetic energy radiation source, such as a lamp producing visible or any other light, and an image receptor plate having a substantial plurality of minute, discrete receptors activated by the electromagnetic energy to produce individual electric signals from such receptors as were activated. The electrical signals are transmitted by transmitting means to an image producing plate having a comparable number of minute discrete electromagnetic signal generators, each of said generators connected to a companion receptor so that activation of a particular pattern of receptors produces an identical pattern of activated generators on the image producing plate. Each of the generators generates an electromagnetic signal in response to the electrical signal from the receptors. The carrier (paper sheet) onto which the image is to be reproduced is placed substantially in contact with the receptor plate. Either liquid or solid toner is placed upon the carrier. The excess liquid or powder is then removed. The powder has magnetic properties so that it is attracted to those generators which are activated, thus producing on the carrier a reproduction of the original image. At this stage, the reproduced image is unstable. It is transported to a development stage wherein the toner is fixed to the paper by a fusing technique which involves either heat or pressure. In either instance, the toner is melted into the paper to form a permanent copy.

In a preferred embodiment of the instant invention the energy-producing device utilizes a visible light emitting source. The receptors may be typical minute photoelectric cells preferably those which are activated by the absence of light. Such a receptor may be one wherein a bias voltage is being produced by or imposed upon all the receptors and the contact of light upon the receptors produces an equalizing current of opposite charge so that only those receptors which do not receive light are producing a signal. The signal from these receptors is then passed to the image producing plate to activate the comparable image generators.

Another system which may be utilized is one in which the receptors are activated by light to produce an electrical signal of a certain charge and value. The image reproducing plate is one in which a constant charge of a certain value is imposed thereon. The signals transmitted from those receptors which are activated are equal to but opposite to the charge on the image plate. Thus, those receptors which are activated neutralize their comparable generators on the image producing plate. Thus, the only generators which are then producing a magnetic flux are those generators which are connected to receptors which did not receive visible light, that is, those in the shadow of the image to be produced.

The description of the instant invention may be facilitated by reference to the following drawings.

A typical photocopy device of the instant invention is illustrated schematically in FIG. 1. A housing 10 encloses the device and provides the support for the glass plate 12 onto which the document or other object is placed which is desired to be copied or reproduced. A lamp 11 directs light upon the document, an image of which is reflected through lens 13 and onto image receiving plate 14. Paper enters opening 15 and is transported by conventional transport means through the device to the upper surface of image reproduction plate 14. A roller 16, the surface which contains magnetic powder, is rolled over the paper on the image reproduction plate which has been activated so that it has magnetic flux lines which conform to the dark portions of the document to be copied. Magnetic flux lines attract the toner powder off roller 16 to cause an image to be formed on the paper on plate 14 identical to the document on glass plate 12.

The paper can then be transported from the plate 14 through an opening 17 to pass through pressure rollers **18*a* and 18*b* to bond the image to the paper and thus produce a bond copy of the original document. Alternatively, a roller can be utilized inside so that the roller can pass over the plate 14 to pressure bond the magnetic toner powder to the paper while it is on plate 14. Plate 14 can be very ruggedly constructed so that it will accept the pressure from a very high pressure roller. Also, the plate 14 can be made temperature resistant so that the toner powder can be fused thermally to the paper before it leaves the reproduction plate 14**.

Figure 1A:
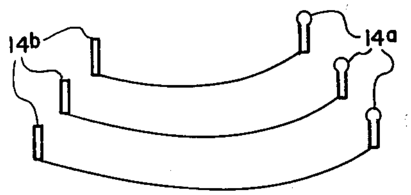
Figure 1B:
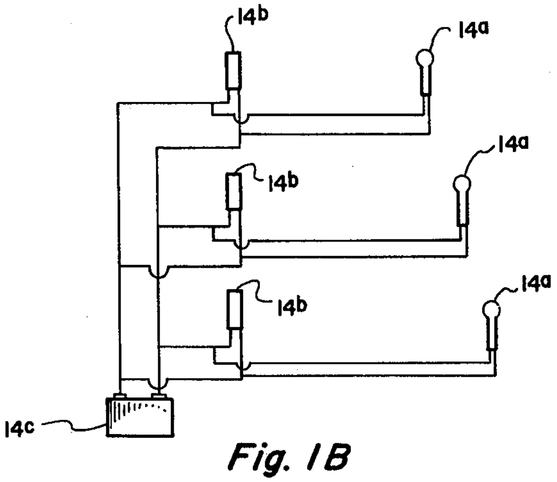

In FIG. 1A and 1B a schematic representation of the basic elements of the image receiving plate and image reproduction plate are illustrated. It is understood that the basic elements of image receiving plate and image reproduction plate may be combined into one plate. However, for purposes of this description, the plates are frequently indicated as being distinct plates, which, in fact, they may be. In FIG. 1A receptors **14*a* are electrically connected to magnetic elements 14*b*. The photo receptors 14*a* are activated by electromagnetic energy, generally but not restricted to, visible light to generate a current which is passed to the electromagnets 14*b* which sets up a magnetic flux to attract metallic powder. In the event that visible light strikes only one of the receptors 14*a***, illustrated in FIG. 1A, then only that corresponding electromagnetic element will be activated so that magnetic powder will be attracted only to that electromagnetic element. Thus, there is discernment among the elements which are activated. It is this discernment which, when a large number of photo receptors and electromagnetic elements are used, gives very precise definition to the images reproduced.

In FIG. 1B a slightly different arrangement is illustrated. In FIG. 1A a negative of the original to be reproduced is reproduced. In FIG. 1A visible light activates a photo receptor which activates a magnetic element. Thus, it is those photo receptors which are struck by light, that is, these which are not part of the image, which are activated. Thus, a negative of the original is reproduced whereby those areas on the original which were light are dark on the copy.

In FIG. 1B an exact duplicate is produced. The photo receptors **14*a* are connected to magnetic elements 14*b* in a slightly different fashion in FIG. 1B. A battery or other means of a d.c. current is also connected to the electromagnets 14*b*. The voltage produced by the battery 14*c* is exactly the same in magnitude as the voltage produced by the photo receptors 14*a*. Also, the direction of the current in the battery 14*c* is opposite the direction of the current produced by the photo receptors 14*a*. When visible light strikes any of the receptors 14*a* a current is generated by that receptor which cancels out the current being supplied by the battery 14*c* to that particular electromagnetic element. Those photo receptors which do not receive any energy do not transmit any current to the corresponding electromagnet so that those electromagnets do receive current from the battery 14*c*** and are thus the ones which attract the toner powder. In this way, the photo receptors which are in the dark area (the image area) are the ones which, in effect, cause their corresponding electromagnets to be activated, attracting powder and causing an exact image of the original to be reproduced.

Figure 2:
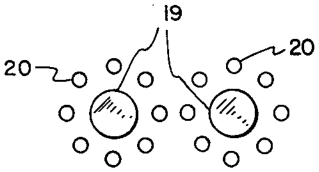

In FIG. 2 there is illustrated photo receptors 19 which are surrounded closely by electromagnets 20. This arrangement of photo receptors and electromagnets would be one which the photo reception plate and the photo reproduction plate are the same plate. As light strikes the photo receptors the magnets 20 would be activated so that an image is reproduced when magnetic powder is applied to a paper which has been placed over the plate. Electromagnets 20 are connected to an external source of current so that the device is similar to that illustrated in FIG. 1B so that a positive image is reproduced, the current may be locked into those electromagnets which are activated so that once light is passed through the original to be copied onto the receptor reproduction plate then those electromagnets which are activated retain current until the current is unlocked by a switching device or other means which may be operated by an operator. Thus, multiple copies could be made in this fashion because once the electromagnets were continuously magnetized a multiplicity of sheets of paper could be applied to the plate powder applied and the paper removed to make way for the next sheet of paper.

The arrangement of photo receptors and electromagnets illustrated in FIG. 2 would be particularly effective where it is desired to make negatives of the copies since the electromagnets could be easily wired to the photo. It is understood, of course, that the photo receptors and electromagnets can be part of the same plate with the photo receptors on one surface and electromagnets on the other surface. For example, in FIG. 1 plate 14 could have the photo receptors on the upper surface with the electromagnets on the lower surface. Since the electromagnets attract the magnetic toner powder electromagnetically any roller passing over it would cause the electromagnetic particles to be attracted to the plate even though the particles were being pulled upward. In fact this would assure against toner particles accidentially falling upon the paper. Some means for holding the paper against the reproduction plate would, of necessity, be required.

Figure 3:
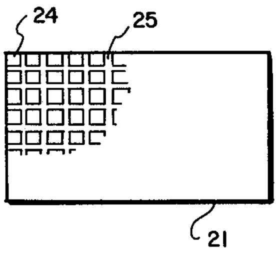
Figure 4:
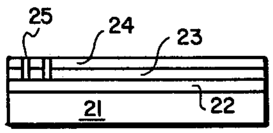

FIG. 3 illustrates a multi-layered photo receptor plate. The receptor plates illustrated in FIGS. 3 and 4 has a base plate 21 onto which several coatings are applied. First, an electroconductive coating 22 is applied to carry bias volting to all the electromagnets. Next, an electromagnet 23 is applied. Finally, a coating of selenium oxide or the like is applied to form a photoelectro coating 24. The coating is then etched to provide a groove 25 which separates the upper two coatings into a great number of very small squares, for example squares of only one-tenth of an inch to one-hundredth of an inch on the side, thereby giving excellent resolution of any copies produced thereby. The upper surface may be round or shaped other than a square. Etching along perpendicular lines is easy and inherently produces square or rectangular areas. Electro conductive plate 22 is used to carry current to the magnetic layer 24 which has been divided into a plurality of very small electromagnets. Photo cell 24 is in direct contact with electromagnet and transfers its pulse directly.

Figure 5:
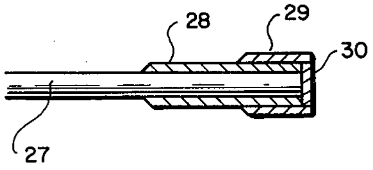
Figure 6:
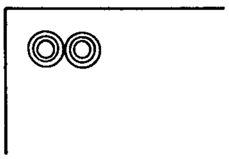

Another technique forming the image plate is illustrated in FIGS. 5 and 6 wherein a conductor wire 27 is coated with electromagnetic coating 28 with an insulated coating 29. Photoelectric coating 30 is deposited on the end of the wire. The plate is then made up from a great number of these elements placed together in a matrix resin or the like with the conductive element 27 in contact with a common conductor plate. The end of the conductive element should not touch the photoelectric cell so that the photoelectric cell transfers energy pulses only to the electromagnetic coating.

The electromagnets occasionally retain residual electromagnetism which can cause blurring of subsequent copies after initial copies have been made. It has been found that it is frequently required to pass a small current in an opposite direction to the current previously passed in order to flush or cleanse the system.

A particular advantage of the instant system resides in its simplicity and the fact that very low voltages and current requirements exist. In fact, the system may be operated with a low voltage battery, thus rendering the whole copier portable. Heretofore bond copiers were very heavy and bulky inasmuch as very heavy transforming equipment and the like was required in order to produce the necessary corona to cause magnetic material to adhere to the selenium drum. The instant system can be operated either from batteries or carried in a brief case or the like and plugged into any 110 volt outlet in order to operate it. The copier could become, like the ubiquitous dictating machine, a piece of office equipment which is easily carried wherever it is needed.

The magnetic flux may be shaped to have pinpoint accuracy by the use of shields or the shaping of the magnets. Also, although dry toner is preferred, liquid magnetic toner may also be utilized.

The process has application in numerous fields, including copying machines, duplicating machines, microfilming, computers, animation produced cartons and the like and in blue printing machines.

I claim:

1. An image reproducing device comprising:

an electromagnetic energy radiating device;

an image receptor plate having a substantial plurality of minute discrete receptors activated by said electromagnetic energy to produce individual electrical signals;

means to transmit said electrical signals to an image producing plate;

means to produce a bias electrical signal to each electromagnetic signal generator on an image producing plate; and an image producing plate having a comparable number of minute discrete electromagnetic signal generators, each of said generators connected to a companion receptor so that activation of a particular pattern of receptors produces an identical pattern of activated generators on the image producing plate, said activated receptors producing an electrical signal which cancels the bias electrical signal to those electromagnetic signal generators so that those generators which correspond to the receptors in the shadow of an image to be reproduced are the only generators activated.

2. An image reproducing device comprising a visible light emitting source;

a plurality of image receptors having a substantial plurality of minute discrete receptors activatable by said light emitting source to produce electrical signals;

means to transmit said electrical signals to a plurality of image generators;

a plurality of image generators having a comparable number of minute discrete electromagnetic signal generators, each of said generators connected to a companion receptor so that activation of a particular pattern of receptors produces an identical pattern of activated generators, each of said generators generating an electromagnetic signal in response to the electrical signal from said generators, all of said generators being located on the same plate as the receptors with each generator being in close proximity to the receptor to which it is electrically connected.

3. The image reproducing device of claim 2 wherein each generator is a part of the same physical structure as the discrete receptor to which it corresponds.

* * * * *